UNITED STATES PATENT OFFICE.

THOMAS S. BLAIR, JR., OF ELMHURST, ILLINOIS, ASSIGNOR TO BLAIR ENGINEERING COMPANY, OF CHICAGO, ILLINOIS, A CORPORATION OF NEW YORK.

MANUFACTURE OF OPEN-HEARTH STEEL.

No. 927,097.  Specification of Letters Patent.  Patented July 6, 1909.

Application filed January 2, 1909. Serial No. 470,437.

*To all whom it may concern:*

Be it known that I, THOMAS S. BLAIR, Jr., a citizen of the United States, residing at Elmhurst, in the county of Dupage and State of Illinois, have invented a new and useful Improvement in the Manufacture of Open-Hearth Steel, of which the following is a specification.

My invention relates to an improvement in the art of manufacturing steel by the so-called "duplex" process, which consists, generally stated, in preparing the metal by the usual blowing operation in the Bessemer converter containing an acid lining and tapping the metal contents of the converter into a ladle for transfer to an open-hearth furnace, into which said contents are introduced for the open-hearth basic treatment therein.

The primary object of my invention is to materially expedite the treatment by the duplex method with the result of greatly increasing the tonnage from the open-hearth practice; and this I accomplish, generally stated, by providing, economically and quickly, and at the most advantageous time, a strongly oxidizing fluid basic slag for use in the practice of the duplex process.

As is well known, by the practice of the process referred to in the acid-lined Bessemer converter, the operation of converting pig iron into steel is accomplished with great rapidity, the metal being desilicized and partially decarburized, or decarburized to the extent desired for its further treatment in the basic open-hearth furnace, wherein the condition of the preliminarily treated metal, it having been rendered devoid of silicon and being at a high temperature, is ideal for the open-hearth treatment which removes the phosphorus and a portion of the sulfur, and should also rapidly boil out the remaining oxids. It is found in practice, however, that the production of a slag of a composition capable of producing the required reactions is slow, so that much of the advantage gained by the rapid action of the duplex process, and in the resultant great tonnage capacity of the furnace, is lost by the slowness of the essential step of producing a suitable slag in the open-hearth furnace. I am aware of attempts to reduce this loss of time, one of these involving the preparation of a suitable slag by charging and melting the basic additions in the open-hearth furnace before charging it with the metal to be heated; another involving the preparation of a suitable slag by melting the basic additions in a separate furnace or cupola and adding it in a fluid condition to the metal in the open-hearth furnace; and still another involving preservation of the slag, or a portion of it, from one heat in the open-hearth furnace, adding lime to maintain its basicity, and charging it with the metal for another heat. However, all of these attempts present disadvantages which are obvious to one skilled in the art.

My invention involves utilizing the acid slag, or a portion of it, from one of the several heats or "blows", of a Bessemer converter which make up the complete charge of blown metal for a basic open-hearth furnace, this slag being already in a fluid condition when it comes from the converter and containing the necessary iron oxid, and usually, also, a considerable quantity of manganese oxid, depending on the content of manganese in the iron under treatment, which is very valuable in assisting in the removal of sulfur in the basic open-hearth furnace. In this condition of the acid slag from the converter, it needs only the addition of the required amount of lime to render it basic and may be delivered to the open hearth furnace along with the metal from the same blow without any cost for handling or fuel for preparing it. This slag being, then, in a fluid, highly oxidizing and strongly basic condition in the open-hearth furnace, I charge into the latter the metal from the number of other blows required to complete its charge,—that is to say without any material amount of the slag from such blows or only sufficient to shield the metal during transfer—, whereupon ebullition of the contents of the furnace quickly ensues and effects the dephosphorizing and desulfurizing of the metal. This ebullition ensues instantaneously if the metals mixed together in the open-hearth furnace from the converter be differential in carbon-content; thus, if the metal of one blow be low in carbon and that from another be high therein, either predominating in the furnace according to whether soft or hard steel is to be the product.

The detailed practice of my improvement may be best described with reference to a typical heat: Assuming one or more 20-ton Bessemer converters to be in use for supplying the blown metal to a plurality of 60-ton open-hearth furnaces, the procedure is as follows: The first blow of 20 tons of metal containing, say, 1.25 per cent. Si. and 1 per cent. Mn. will produce, approximately, 2.4 tons of slag containing 50 per cent. $Si.O_2$, 20 per cent. FeO and 13 per cent. Mn.O, varying according to the manganese content in the pig iron. The metal of this blow is poured into a ladle, as is about one-half of the acid slag (the remainder being thrown away), thus providing in the ladle 1.2 tons, or 2400 pounds, of slag containing 1200 pounds of $Si.O_2$ and 480 pounds of FeO. To render this actively basic, 3600 pounds of CaO are added, preferably in the form of calcined lime, while the metal is being poured from the converter into the ladle; or part of it may be thus added and the remainder introduced into the open-hearth furnace after the first ladle-contents have been poured into the same. This ladle of metal and slag is poured into the open-hearth furnace, and the remaining two ladles, each of twenty tons of blown metal, substantially free from slag, are added in succession, as expeditiously as possible, the required amount, if any, of fluor spar and iron oxid (either in ore or roll-scale form) having been added to the bath between the pouring of the first and last ladles. In fact, it is sometimes desirable, when the slag is low in oxids, to "overblow" the metal in the converter for the purpose of increasing the oxidizing action thereon to thereby expedite the dephosphorizing action in the open-hearth. This however being suggested by way of information, the same not forming an essential part of the present invention. Thus there is contained in the hearth 60 tons of metal with 7000 pounds of slag containing, as an extremely active basic slag, 52 per cent. CaO, 14 per cent. (or more) FeO and 17 per cent. $SiO_2$. The figures given are only intended to be approximate, and will vary with varying conditions.

The rest of the operation in the open-hearth furnace, namely, the boiling out of the oxids and tapping, need not be herein described, as it presents no novelty and is familiar in the art.

As will thus be seen, my improvement enables the open-hearth furnace for the operation thereof under the duplex process, to be supplied with a highly oxidizing basic slag at the proper moment much more cheaply and expeditiously than by any procedure known to me, and effects a reduction in the time required for a heat from five to six hours, according to the usual practice, to about one and one-half to two hours.

What I claim as new and desire to secure by Letters Patent is—

1. The improvement in the art of manufacturing open-hearth steel, which consists in subjecting to acid-Bessemer conversion metal to be afterward treated in an open-hearth furnace, charging into said furnace metal and slag from such conversion with lime added to convert the acid slag into a basic slag, and thereafter charging said furnace with the metal from further acid-Bessemer conversion.

2. The improvement in the art of manufacturing open-hearth steel, which consists in subjecting to acid-Bessemer conversion metal to be afterward treated in an open-hearth furnace, pouring the metal and slag from such conversion into a ladle, adding lime to the contents of the ladle to convert the slag therein to a basic slag, introducing the contents of the ladle into such furnace, and thereupon charging said furnace with the metal from further acid-Bessemer conversion.

3. The improvement in the art of manufacturing open-hearth steel, which consists in subjecting to acid-Bessemer conversion metal to be afterward treated in an open-hearth furnace, pouring the metal and slag from said conversion into a ladle, adding lime to the contents of the ladle to convert the slag therein to a basic slag, introducing the contents of the ladle into such furnace, and thereupon charging said furnace with the metal from further acid-Bessemer conversion, and in preparing the several converter-charges blowing them to differential carbon-content.

THOMAS S. BLAIR, Jr.

In the presence of—
CHAS. E. GAYLORD,
RALPH A. SCHAEFER.